United States Patent [19]
Robbins

[11] Patent Number: 5,780,784
[45] Date of Patent: Jul. 14, 1998

[54] CANCELLATION OF TOOL MODE SIGNAL FROM COMBINED SIGNAL

[75] Inventor: Carl A. Robbins, Tomball, Tex.

[73] Assignee: Halliburton Energy Services, Inc., Houston, Tex.

[21] Appl. No.: 733,367

[22] Filed: Oct. 17, 1996

[51] Int. Cl.[6] ............................................. G01V 1/40
[52] U.S. Cl. .......................... 181/102; 181/108; 181/112; 340/855.6; 340/856.3; 367/34; 73/152.16; 73/152.47; 175/40; 175/50
[58] Field of Search ......................... 340/855.6, 856.4; 181/102, 108, 112; 367/34; 73/152.16, 152.47; 175/40, 50

[56] References Cited

U.S. PATENT DOCUMENTS

5,639,997  6/1997  Mallett ............................ 181/102

*Primary Examiner*—J. Woodrow Eldred
*Attorney, Agent, or Firm*—Conley, Rose & Tayon, P.C.

[57] ABSTRACT

A system for eliminating the tool mode signal from a received combined signal comprising both tool mode and formation mode components, comprising: a formation receiver for receiving said combined signal, a reference receiver for receiving a tool mode reference signal, a filter for processing said tool mode reference signal and generating a predicted tool mode component of the combined signal, and a summation element for subtracting said predicted tool mode component from said combined signal and generating a predicted formation mode component. The filter preferably incorporates a portion of the output of the summation element as an error signal, enabling the filter to adapt to changing conditions and update the algorithm on which it makes its predictions. According to an alternative system, an average value for the tool mode signal is updated according to a moving average to which new data points are added as they become available. Tool mode signals are distinguishable from signals having both components because they have lower energies. When a signal is received having the lower energy that is indicative of the absence of a formation mode signal, the data point is treated as a purely tool mode signal and is added to the moving average.

15 Claims, 5 Drawing Sheets

CANCELLATION OF TOOL MODE SIGNAL FROM COMBINED SIGNAL

TECHNICAL FIELD OF THE INVENTION

The present invention relates generally to a downhole system for facilitating the downhole measurement of data relating to the formation during drilling. More particularly, the present invention relates to a drill string tool measuring sonic parameters of the formation and a system for eliminating errors associated with the mechanical packaging of the necessary sensors. Still more particularly, the invention relates to a logging while drilling (LWD) tool that includes a formation receiver and a reference receiver. The system uses a prediction filter to predict the portion of the signal received at the formation receiver that is attributable to the tool mode. This predicted value is subtracted from the formation receiver signal so that the balance of the formation receiver signal comprises the formation signal only.

BACKGROUND OF THE INVENTION

Figure 1:
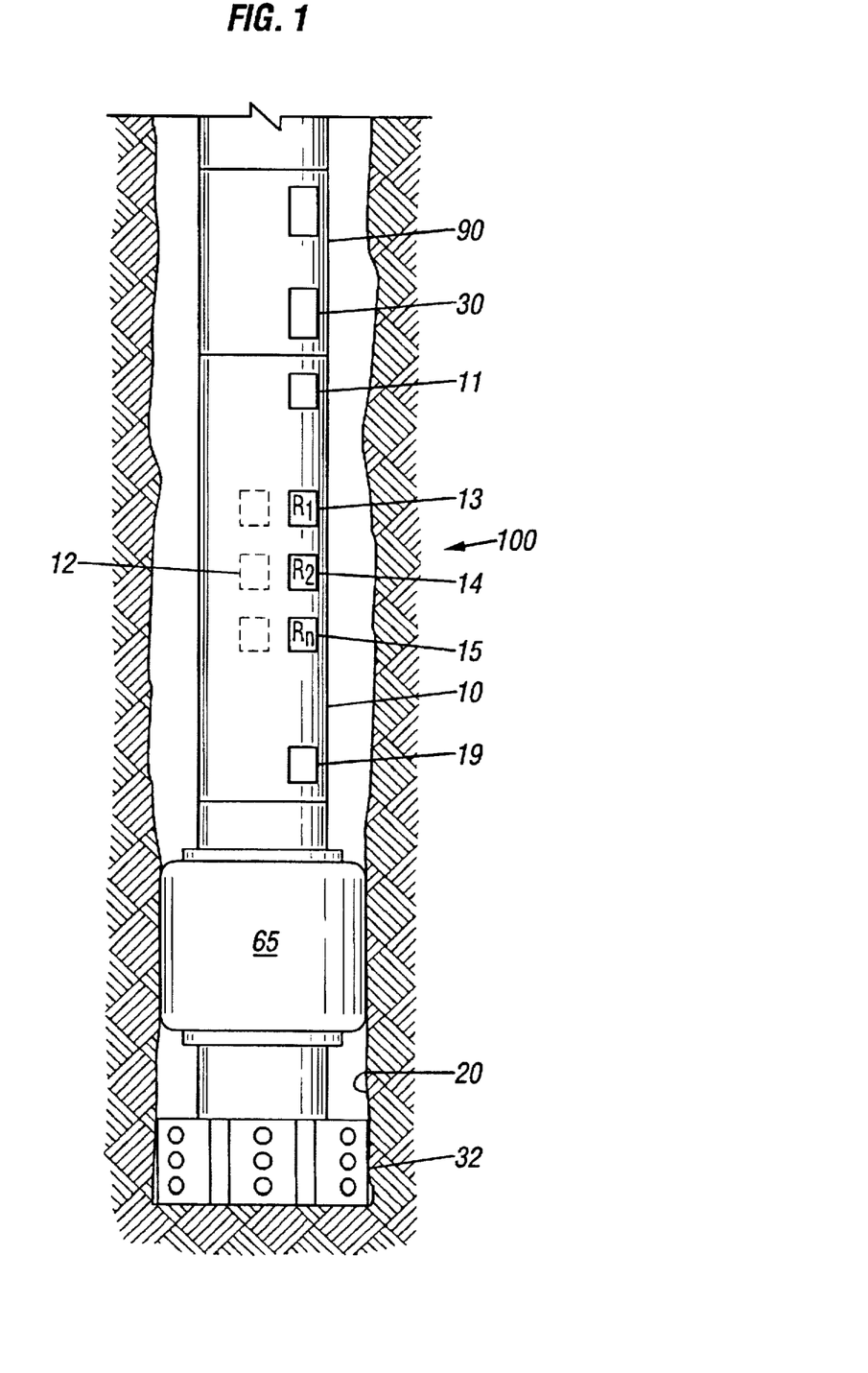
FIG. 1 is a schematic diagram of an LWD tool in a borehole.

As shown in FIG. 1, a typical bottomhole drilling assembly 100 preferably includes a drill bit 32 for drilling a wellbore 20, an LWD tool 10 including acoustic transmitters 11 and 19 and an array of receivers $R_1$ to $R_n$, one or more stabilizers 65, and a mud pulser collar 90. Other logging sensors may be used in conjunction with the acoustic transmitters and the receiver array, as will be understood by one skilled in the art. For example, directional sensors may be provided in LWD tool 10, or elsewhere in the bottomhole assembly (BHA) 100 to provide an indication of inclination angle of the BHA 100, the azimuth of BHA 100, and the tool face angle.

The BHA 100 also preferably includes a downhole controller unit 30, which orchestrates the operation of the various downhole sensors. The downhole controller 30 also provides processing capabilities downhole to permit the sensed data to be processed in a real-time environment, and to permit the processed data to be available during the drilling process. For purposes of illustration, downhole controller 30 is shown in FIG. 1 in the lower portion of the mud pulser collar 90. As one skilled in the art will realize, the downhole controller could be located in any convenient location in the BHA, including in the acoustic logging tool 10.

A drill string (not shown) connects the bottomhole assembly 100 to the surface drilling equipment in accordance with conventional techniques. The drill bit, mud pulser collar and drill collars preferably comprise components that are known in the drilling industry. Thus, these components will not be described in detail herein, except as they particularly relate to the present invention.

The bottomhole drilling assembly 100 may include a downhole motor for operating the drill bit 32 in accordance with conventional techniques, and/or the drill bit may be operated by rotating the entire drillstring from the surface of the well. Drilling mud is preferably forced through the interior of the drillstring, and through the interior of the bottomhole drilling assembly. The drilling mud exits through nozzles in the bit and functions to cool and lubricate the bit and to remove earth cuttings and carry the cuttings to the surface along the annulus between the drill string and wellbore 20. The drilling mud also serves as a communication medium between telemetry and control units in the mud pulser collar 90 and components at the surface of the well. By altering the flow of the drilling mud through the interior of the drill string, pressure pulses may be generated, in the form of acoustic signals, in the column of drilling fluid. By selectively varying the pressure pulses through the use of a mud pulser in the mud pulser collar 90, encoded binary pressure pulse signals can be generated to carry information indicative of downhole parameters to the surface for immediate analysis. As one skilled in the art will understand, the drilling mud also may perform a number of other functions, including providing operating power to the downhole motor or other downhole components.

The LWD tool 10 is preferably located close to drill bit 32 to facilitate the ability to examine the formation as close to the bit as possible. As one skilled in the art will understand, the LWD tool 10 could also be located further up the bottomhole assembly 100 from the drill bit 32, without departing from the principles of the present invention. Moreover, and as discussed more fully with respect to FIG. 14, the LWD tool 10 may in actuality comprise multiple collar sections to increase the distance or aperture between the upper receiver and lower receiver.

The attenuation of the acoustic wave increases with the frequency $f$ of the acoustic wave. Thus, the higher the acoustic frequency, the greater is the attenuation. To increase the depth of investigation of the tool, it is necessary to decrease the transmitted acoustic wave frequency (which conversely increases the wavelength). Because of these competing criteria, the present invention envisions a transmission frequency of 5 kHz–20 kHz for investigation of the formation surrounding the borehole, and 100 Hz–1000 Hz for investigation of the formation ahead of the borehole. With either type of investigation, a receiver spacing of $1(\lambda)$–$5(\lambda)$ is preferred.

FIG. 1 depicts two transmitters 11 and 19 and a receiver array comprising receivers 13, 14, 15. Receivers 13, 14, 15 are axially spaced from the transmitter and mounted so as to be sensitive to acoustic signals arriving through the formation. Hence, receivers 13, 14 and 15 are hereinafter called "formation receivers". The invention can, alternatively be constructed with additional or fewer transmitters, or with additional or fewer receivers, as desired. Similarly, instead of the axial alignment shown in FIG. 1, many other transmitter and receiver alignments can be used, as will be understood by those skilled in the art. In operation, the transmitters generate a short acoustic pulse, with a central frequency band in the range of 5–20 kHz, with a frequency of approximately 12 kHz considered optimal. Alternatively, a swept frequency signal may be used instead of the short acoustic pulse signal.

As shown in FIG. 1, the transmitters and receivers preferably are aligned axially along the outer wall of logging tool 10. In the preferred embodiment (assuming a transmission frequency of approximately 12 kHz), transmitter 11 and receiver 13 are spaced apart a distance of approximately four feet. Each of the receivers preferably are spaced a foot apart, and receiver 15 and transmitter 19 are spaced four feet apart. Other spacings may be used, as desired, as the transmission frequency is modified for the particular circumstances. As one skilled in the art will understand, the spacings are largely determined by the transmission frequency of the transmitters.

A signal fired from either of the transmitters 11, 19 passes along various paths through the mud, the formation and the tool itself before being received at each of the arrayed receivers 13, 14, 15 in turn. Because the distance between the receivers is known, the time delay between arrival of the signal at each of the arrayed receivers can be used to calculate velocity of the signal, which in turn can be used to provide valuable insight into the characteristics of the formation in the region of the borehole. In addition, the same acoustic logging tool can also be used to determine information regarding the adjacent bed boundaries, including the distance from the borehole to the boundary, the dip angle of the boundary, the direction of the boundary, and at least to some extent, the characteristics of the boundary.

Analysis of the received acoustic signals, however, is complicated by the fact that a significant portion of the signal received at the formation receiver is transmitted along a path through the tool itself, hereinafter referred to as the "tool mode" signal. The tool mode signal arrives at the receiver(s) at approximately the same time as the formation signal and interferes with the formation signal, making it difficult to gain information about the formation. It is therefore desirable to provide a method for separating the tool mode signal from the balance of the received signal.

In other downhole acoustic systems, such as wireline tools, it is known to modify the body of the tool itself by including therein a plurality of slots and grooves such that the acoustic signal through the tool is attenuated to such a degree that the tool mode signal does not significantly affect the signal received at the formation receiver, as disclosed in U.S. Pat. No. 4,850,450. Alternatively, non-rigid isolation joints mary be used to avoid transmission of a tool mode signal, as disclosed in U.S. Pat. No. 4,951,267. Wireline tools, however, are run into the hole for the sole purpose of measuring various downhole parameters, and therefore do not require substantial mechanical strength. The attenuation method for reducing the transmission of the signal through the wireline tool is not applicable to drilling applications, as the slots and grooves in the tool body would reduce the mechanical strength of the tool below minimum levels required for drilling and would prevent the drill string from functioning as a conduit for the mud. Examples of other acoustic wireline tools are U.S. Pat. Nos. 3,237,153, 3,312,934, 3,593,255, 4,649,525, 4,718,04, 4,869,349, and 5,069,308.

The portion of the signal that travels through the mud annulus is slower and arrives much later than signals traveling through the tool or the formation. Therefore, the mud annulus portion of the signal is not typically a factor in LWD signal interpretation.

Figure 2A:
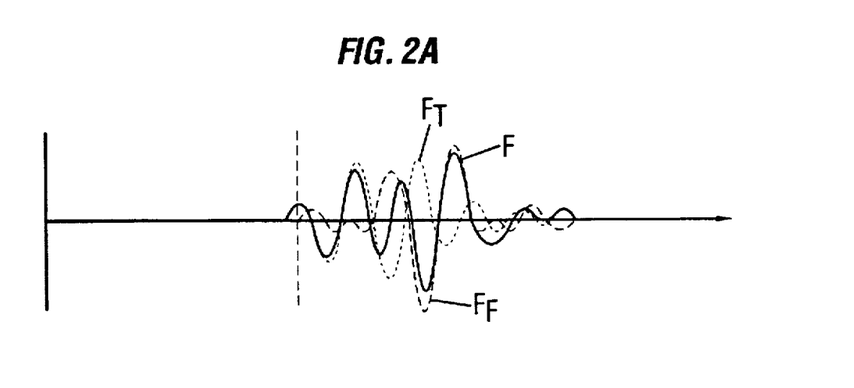
FIG. 2 illustrates the received and predicted signals in a typical formation environment.
Figure 2B:
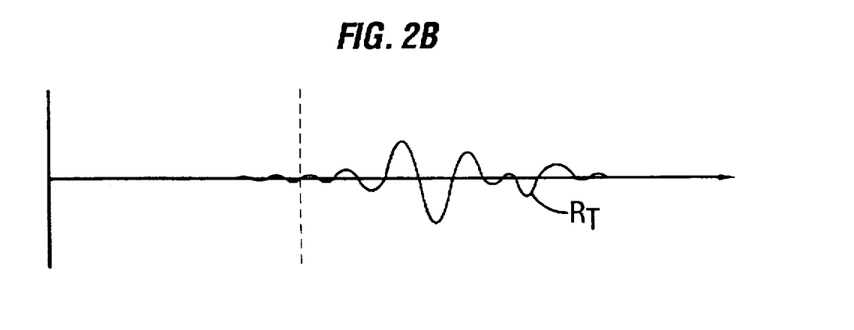
Figure 2C:
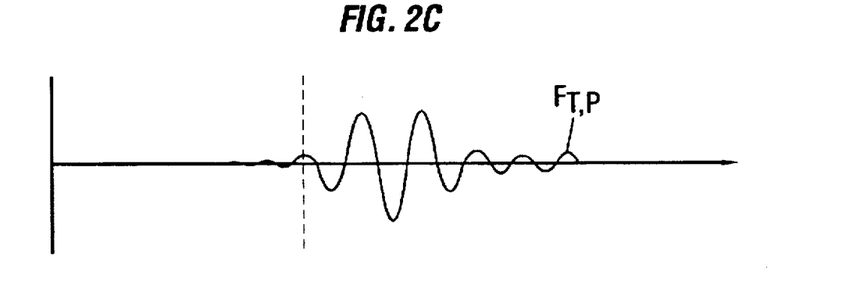
Figure 2D:
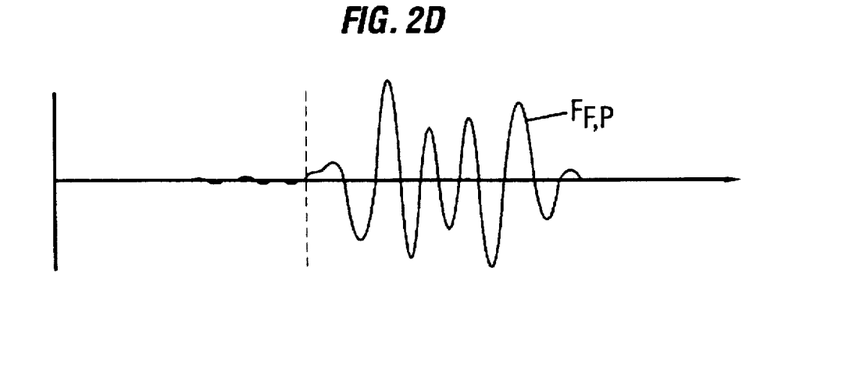

Because the mud borne signal is not a factor, the signal F that arrives at the formation receiver essentially comprises the sum of the formation path signal $F_F$ and the tool mode signal $F_T$ received at the formation receiver, as shown in FIG. 2(A). It is desired to provide an apparatus and system for predicting the tool mode signal received at the formation receiver so that the predicted value can be eliminated from the formation receiver signal, leaving the formation signal only. It is further desired that the apparatus be capable of inclusion in a drill string and able to withstand the mechanical and environmental stresses of the downhole environment. Other objects and advantages of the invention will appear from the following description.

SUMMARY OF THE INVENTION

The present LWD tool comprises a length of pipe incorporated in the drill string. A first transmitter is located at one end of the LWD tool, a second transmitter is positioned at the opposite end of the LWD tool, and two or more receivers are arrayed between them. A signal fired from either transmitter passes through the mud, the formation and the tool itself before being received at each of the arrayed receivers. The time delay between arrival of the signal at each of the arrayed receivers can be used to calculate velocity of the signal, which in turn can be used to gain information about the formation surrounding the borehole. Because there is some overlap in the velocity of the signal through the tool and its velocity through the formation, the time of arrival at any given receiver cannot be used as a basis for rejecting the tool mode signal. In fact, in some instances the formation signal may arrive at the formation receiver before the tool mode signal.

According to the present invention, the LWD tool includes at least one reference receiver for receiving tool mode signals and an adaptive canceler for generating a calculated formation signal. The adaptive canceler includes a filter for predicting the tool mode signal received at the formation receiver based on the signal received at the reference receiver. The predicted tool mode signal is then subtracted from the total signal received at the formation receiver, leaving the calculated formation signal.

The filter is preferably an adaptive finite impulse response (FIR) filter that uses a portion of its own output to update its predictive algorithm and thereby reduce error in the output. The error signal is generated by passing the total output of the adaptive canceler through an attenuator. The error signal is then returned to the filter and used to adjust the filter coefficients. Alternatively, the filter could be an Infinite Impulse Response (IIR) filter, such as are known in the art.

According to an alternative embodiment, the present method can predict the tool mode signal based on a moving average of past tool mode signals. In this alternative embodiment, signals are included in the moving average when the energy of the signal received at the formation receiver is substantially less than the energy of a combined signal, indicating that the signal is essentially a tool mode signal.

BRIEF DESCRIPTION OF THE DRAWINGS

For a detailed description of a preferred embodiment of the invention reference will now be made to the accompanying drawings wherein.

DETAILED DESCRIPTION OF THE INVENTION

As described above, an LWD tool typically includes at least one transmitter and at least one receiver. Because signals passing through the tool itself interfere with reception and recognition of signals arriving through the formation, it is desirable to subtract these tool mode signals from the total received signal. The present invention comprises an improved LWD tool and a system for predicting the formation signal even when a significant portion of the total signal received at the receiver was transmitted via the tool mode rather than through the receiver.

The present invention includes alternative systems for obtaining a predicted value for the tool mode signal received at the formation receiver. The faster but less accurate system, which includes the use of a moving average, is described first, followed by the more accurate system, which includes the use of a adaptive filter.

Moving Average

Referring again to FIG. 2(A), the total signal F arriving at the formation receiver comprises the sum of a formation path signal $F_F$ and a tool mode signal $F_T$ received at the formation receiver. The present invention includes a system for estimating $F_T$, which in turn allows $F_F$ to be estimated.

One way to estimate the tool mode signal received at the formation receiver $F_T$, is to assume that this portion of the formation receiver signal is essentially constant. Using this assumption, $F_T$ can be measured by calibrating the tool in a formation-free environment. For example, the tool can be placed in a water tank and fired several times to obtain an average value for $F_T$. In a water tank there is no formation, so the formation contribution $F_F$ is zero and $F_T$=F. Once a tool has been calibrated in a water tank, $F_F$ can be obtained downhole by subtracting this initial average value of $F_T$ from F.

A completely constant $F_T$ is not entirely satisfactory, however, as borehole pressure, temperature and other factors cause gradual variations in the transmission of tool mode signals. According to a preferred system, this constant average value for $F_T$ is updated according to a moving average to which new data points are added as they become available. Most signals F that comprise both tool mode and formation mode components, $F_f$ and $F_t$, will have energies within a certain range. The energy of a signal lacking a formation signal $F_F$ will be lower than the energy of a signal comprising both formation and tool mode signals and will be distinguishable from signals having both components for that reason. When a signal F is received having a lower energy that is indicative of the absence of a formation mode signal, the data point is treated as a purely tool mode signal and is added to the moving average.

For example, if the diameter of the borehole is significantly increased, such as in the instance of a borehole wash out, the formation signal $F_f$ will be essentially eliminated and the signal F will essentially equal $F_t$. Other instances in which F is equal to $F_t$ include those where the tool is at an angle such that signals are not normal to the receivers, and other anomalous borehole situations that prevent the signal from reflecting properly down the formation. It has been found that approximately ten to twenty percent of the signal received at the formation receiver F are of this nature and are therefore suitable for inclusion in the moving average calculation of $F_T$.

Each time a data point is added to the moving average, the oldest data point is eliminated from the average. Several such signals, preferably as many as forty, are included in the moving average calculation. Inclusion of so many signals in the moving average reduces the weight given to any one data point and decreases the impact of the occasional anomalous signal.

Adaptive Filtering

In contrast to the method described above, an adaptive filtering technique for obtaining the formation signal $F_F$ gives greater accuracy. Referring again to FIG. 2, the signal F received at the formation receiver comprises the sum of signals $F_T$, $F_F$, which are transmitted via the tool mode and formation paths respectively. The tool mode signal $F_T$ must be separated from the total signal F so that information relating to the formation can be extracted from the balance $F_F$. Without additional information, however, it is impossible to separate the tool mode signal $F_T$ from the total received signal F.

Referring again briefly to FIG. 1, to utilize the adaptive filtering technique of the second embodiment, at least one reference receiver 12 (shown in phantom) is located in the LWD tool adjacent the formation receiver(s) and receives a signal R. Reference receiver 12 is housed in the collar itself and is mounted so as to be acoustically isolated from all but tool mode signals. Because reference receiver 12 receives no formation signal ($R_F$=0), the signal R can be designated $R_T$. $R_T$ is not identical to $F_T$. However, assuming that both are substantially constant and that the relationship between them is substantially constant, the relationship can be analogized, allowing an unknown $F_T$ to be predicted from a known $R_T$. This predicted $F_{T,P}$ is then subtracted from the formation signal F to produce the predicted formation signal $F_{F,P}$.

Figure 3:
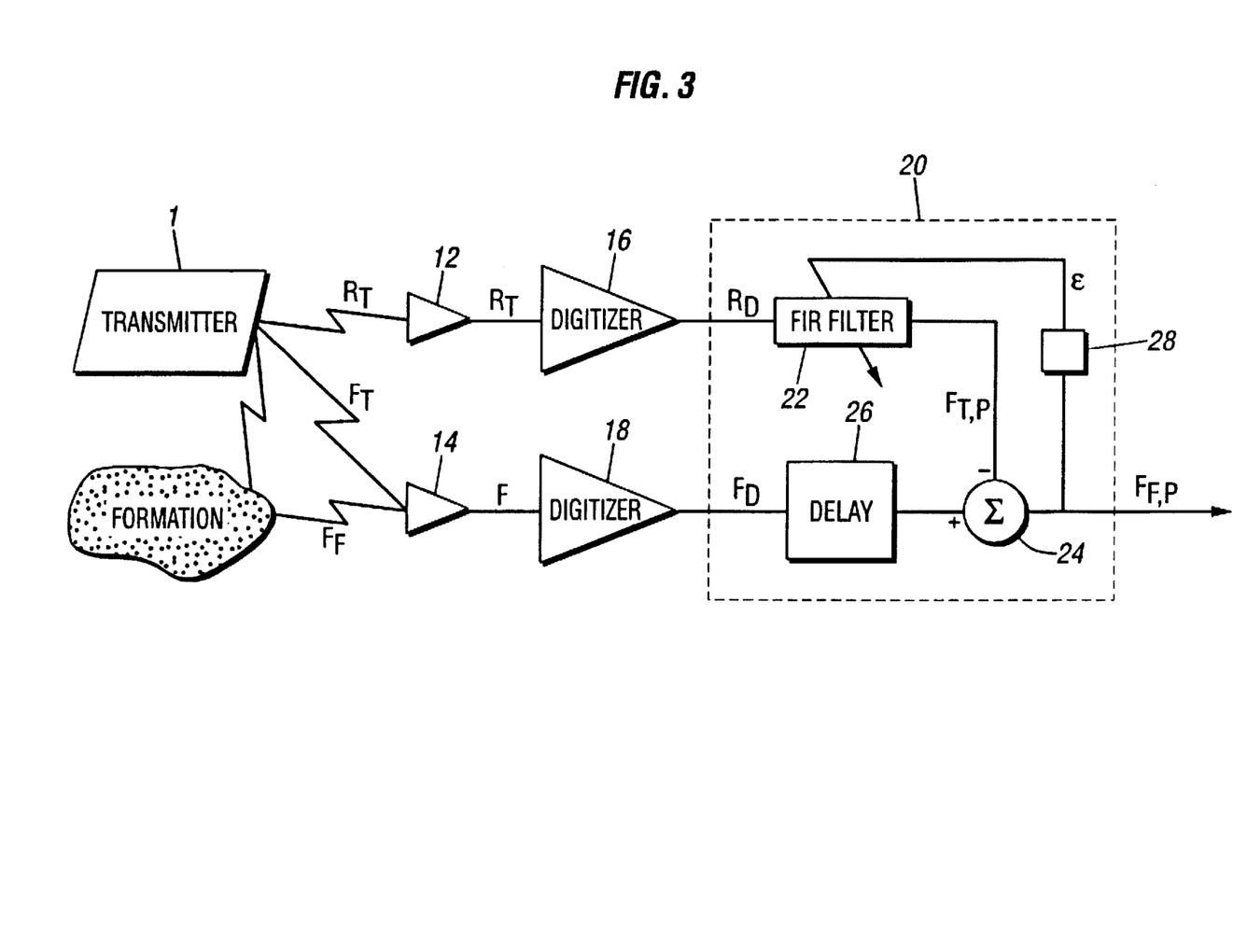
FIG. 3 is a block diagram showing the signal processing system according to the present invention.
Figure 4A:
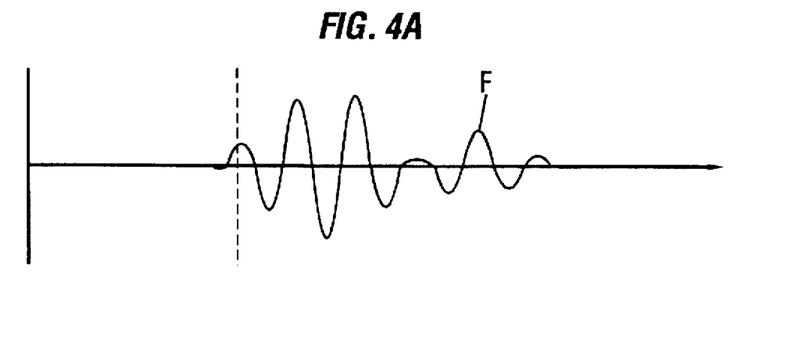
FIG. 4 illustrates the received and predicted signals in a control environment.
Figure 4B:
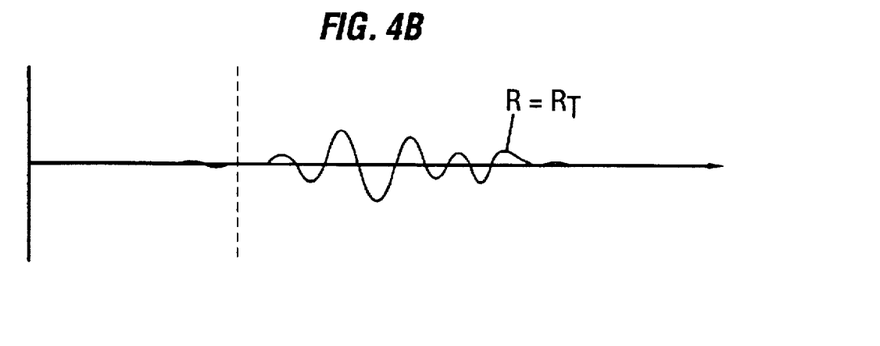
Figure 4C:
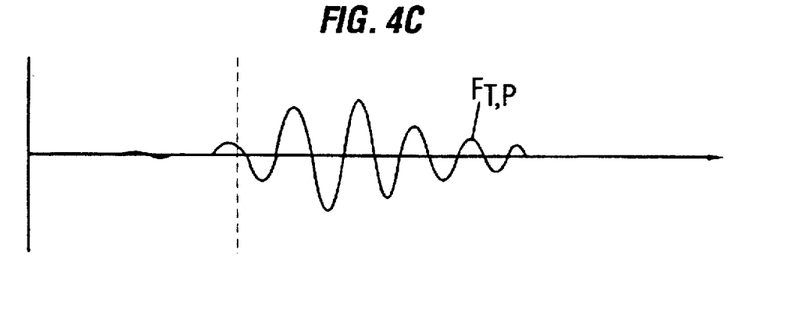
Figure 4D:
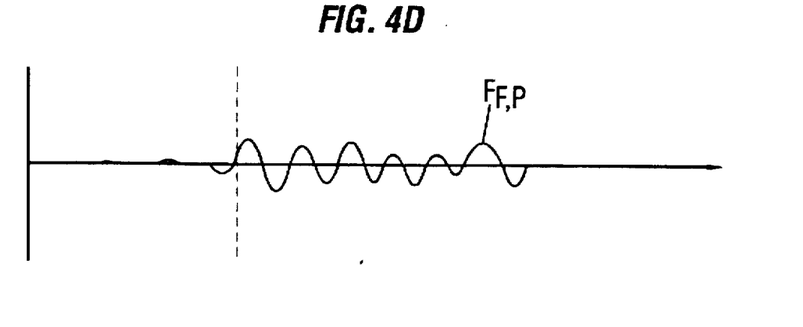
Figure 5A:
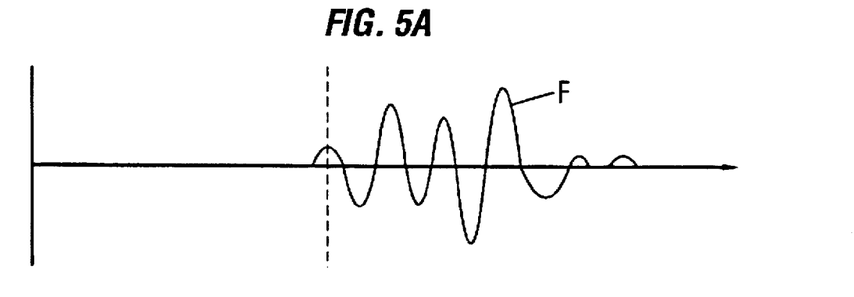
FIG. 5 illustrates the received and predicted signals in a second formation environment.
Figure 5B:
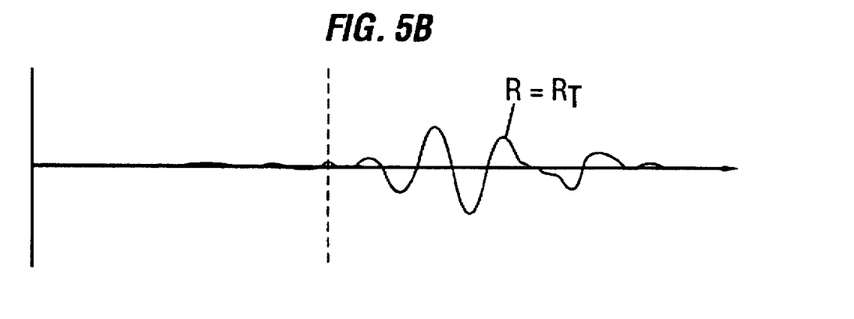
Figure 5C:
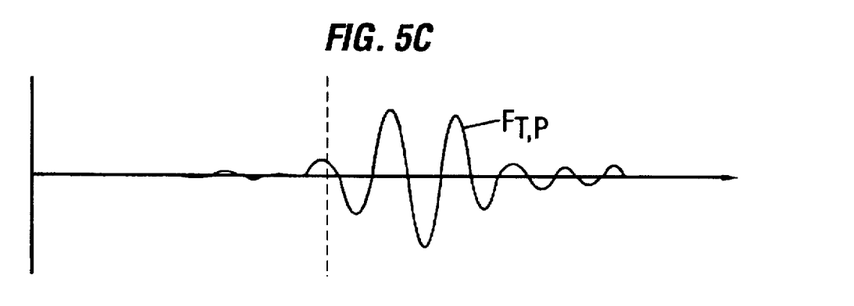
Figure 5D:
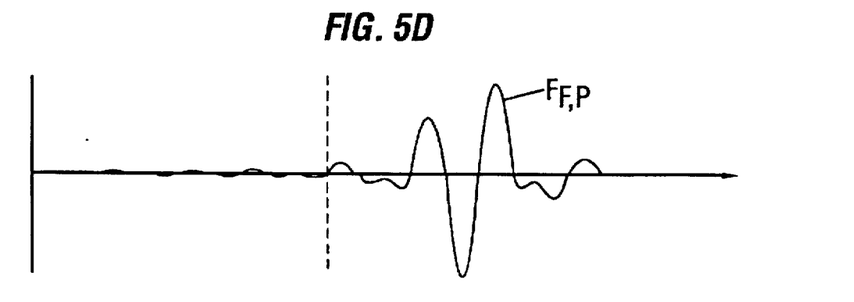

Referring now to FIG. 3, the present system includes transmitter 11, reference receiver 12, formation receiver 14, first and second digitizers 16, 18 and an adaptive canceler 20. As described above, reference receiver 12 is acoustically isolated from the formation so that it receives only a signal $R_T$ transmitted through the tool. Formation receiver 14 is acoustically sensitive to the formation signal $F_F$, but also receives tool mode signal $F_T$, receiving a total signal F equal to the sum of $F_F$ and $F_T$ (FIG. 2(A)). Each receiver 12, 14 feeds its output to a digitizer 16, 18. The output of these digitizers feeds adaptive canceler 20.

Adaptive canceler 20 includes a finite impulse response (FIR) digital filter 22, which receives a digitized signal from digitizer 16. FIR filter 22 is preferably trained or calibrated beforehand, so that it contains a set of weighting coefficients that enable it to accurately predict the tool mode signal received at the formation receiver ($F_{T,P}$) based on the input of the tool mode signal received at the reference receiver $R_T$. It is preferred that filter 22 be an adaptive filter. An adaptive filter differs from a fixed filter in that it automatically adjusts its own impulse response, or weights. Adjustment is accomplished through an algorithm, preferably a least-mean-square algorithm, such as are known in the art, that responds to an error signal dependent, among other things, on the filter's output. Thus, with the proper algorithm, the filter can operate under changing conditions and readjust itself continuously to minimize the error signal.

Still referring to adaptive canceler 20, the predicted tool mode signal $F_{T,P}$ is fed as a negative input to summation element 24. The output of digitizer 18, representing the digitized total signal F received at formation receiver 14, is fed through a delay device 26 and from there as a positive input to summation element 24. There, the predicted tool mode signal received at the formation receiver $F_{T,P}$ is subtracted from the total actual signal F. Delay 26 compensates for the time required for the reference signal to pass through filter 22, so that the outputs of filter 22 and delay 26 remain synchronized. The output of summation element 24, $F_{F,P}$, is a predicted value for the formation element $F_F$ of the signal received at formation receiver 14.

Further according to the present invention, a portion of signal $F_{F,P}$ is passed through an attenuator 28 and returned to filter 22 as an error signal ε. This error signal E can be used to update the weighting coefficients of filter 22 regardless of whether a formation mode signal is actually received. If no formation mode signal is being received, the output of summation element 24, $F_{F,P}$ should be zero and therefore the error signal ε represents the filter error and any non-zero output can be used to update the coefficients of filter 22 until $F_{F,P}$ is zero. On the other hand, if a formation mode signal is being received, the error signal ε derived from any given $F_{F,P}$ is not representative of the actual filter error, but over the long term the formation portion of the output signal $F_{F,P}$ will average to zero, so that the long term average of the error signal ε will accurately represent the average error in the filter prediction of the tool mode portion of the signal.

The optimal degree of attenuation used to generate ε can be calculated by various known mathematical techniques, or can be selected using trial and error. A typical attenuator may multiply the signal by a factor of approximately 0.002 (²/₁₀₀₀) to generate the error signal ε. If the degree of attenuation is too great, the error signal will not significantly adjust the weighting coefficients of the filter algorithm. If the degree of attenuation is too small, the error signal will overwhelm the algorithm and cause undesired fluctuations in its output.

In this manner, the FIR can be updated continuously to minimize error ε and will maintain an accurate algorithm for predicting $F_T$ based on $R_T$. Because each $F_T$ is calculated or predicted from a single corresponding $R_T$, short-term variations in the actual tool mode signal are reflected in the predicted $F_T$. Thus the short-term accuracy and responsiveness of the adaptive filtering technique are superior to those of the fixed value or moving average methods.

Similar adaptive cancellation techniques are used in the medical arts for the purpose of eliminating noise from compound signals. Mathematical aspects of these techniques are discussed in detail in *Adaptive Noise Cancelling: Principles and Applications*, Widrow, B. et al., Proceedings of the IEEE, vol. 63, no. 12 (1975), and in *The Time-Sequenced Adaptive Filter*, Ferrara, E. R. Jr. and Widrow, B., IEEE Transactions on Acoustics, Speech, and Signal Processing, vol. ASSP-29, no. 3, (1981).

Examples

Referring now to FIGS. 2, 4 and 5, the overall results of the adaptive filtering technique are illustrated. The results shown in FIG. 2 were generated in an actual limestone formation. In FIG. 2(A), discussed above, the total formation signal is shown, as well as its components $F_T$ and $F_F$. FIG. 2(B) shows the corresponding signal $R_T$ that was received at the reference receiver. 2(C) shows the predicted tool mode signal for the formation receiver $F_{T,p}$, which was calculated by passing $R_T$ through the trained adaptive filter. Lastly, 2(D) shows the difference function that is generated when 2(C) is subtracted from 2(A). Thus 2(D) is the estimated waveform for the formation component of the signal received at the formation receiver.

Similarly, in FIGS. 4 and 5 waveform (A) is the total signal received at the formation receiver, waveform (B) is the total signal received at the reference receiver (and therefore comprises only a tool mode signal, $R_T$), waveform (C) is the tool mode signal predicted for the formation receiver based on the reference signal R, and waveform (D) is the difference between (A) and (C), comprising the formation mode signal predicted for the formation receiver. The waveforms in FIG. 4 are the results of signals transmitted in a control environment. The LWD tool was run in a water tank which effectively eliminated any formation mode signals. Therefore, like the reference signal, the total signal at the formation receiver (A) should be equal to the actual tool mode signal. Because waveform (D) is the difference between the predicted tool mode signal and the total signal received, waveform (D) would be zero in this formationless environment if the predicted tool mode signal were perfectly accurate. Thus, a non-zero waveform at (D) indicates the magnitude of error in the prediction of the tool mode signal.

It is believed that in actual operation the error in the predicted signal will lass than that shown in FIG. 4. For example the waveforms shown in FIG. 5 reflect the signals received when the LWD tool was run in an environment of 20 percent porosity Berea sandstone. In FIG. 5, waveform (D) of FIG. 5 includes less error than waveform (D) of FIG. 4, indicating that the prediction of the tool mode signal was more accurate in this environment. In addition, refinements in the capabilities of the tool will further increase accuracy.

It will be understood that the reference signal $R_T$ from a single reference receiver can be processed by multiple algorithms to give the predicted $F_T$'s for multiple formation receivers. In such a case, the signal $R_T$ is fed simultaneously to similar adaptive cancelers such as 20, each with its own set of prediction filter characteristics, with one adaptive canceler corresponding to each formation receiver. Alternatively, a reference receiver can provided for each formation receiver, as shown in phantom in FIG. 3.

While a preferred embodiment of the invention has been shown and described, modifications thereof can be made by one skilled in the art without departing from the spirit of the invention.

What is claimed is:

1. A method for extracting a formation signal from a first signal comprising both tool and formation signals received at a first receiver, comprising the steps of:
   measuring a second tool mode signal at a second receiver;
   processing said second tool mode signal to obtain a predicted value for the tool mode portion of the first signal;
   subtracting said predicted value from the first signal;
   whereby the balance of the first signal comprises its calculated formation mode portion.

2. The method according to claim 1, further including the step of using an attenuated portion of said calculated formation mode portion of the first signal as an error function to increase the accuracy of the processing step.

3. A system for eliminating the tool mode signal from a received combined signal comprising both tool mode and formation mode components, comprising:
   a formation receiver for receiving said combined signal;
   a reference receiver for receiving a tool mode reference signal;
   a filter for processing said tool mode reference signal and generating a predicted tool mode component of the combined signal; and
   a summation element for subtracting said predicted tool mode component from said combined signal and generating a predicted formation mode component.

4. The system according to claim 3 wherein said filter is a infinite impulse response filter.

5. The system according to claim 3 wherein said filter is an finite impulse response filter.

6. The system according to claim 5 wherein said filter uses a least-mean-square algorithm.

7. The system according to claim 3 wherein said filter is an adaptive filter.

8. The system according to claim 3 wherein a portion of said predicted formation mode component is returned to said filter and used to adjust output of the filter.

9. The system according to claim 3, further including a plurality of formation receivers.

10. The system according to claim 9, further including a filter for each of said formation receivers, each of said filters processing said tool mode reference signal and generating a predicted tool mode component of the combined signal received at a corresponding formation receiver.

11. The system according to claim 9, further including a plurality reference receivers, each of said reference receivers corresponding to a formation receiver.

12. The system according to claim 3, wherein said filter and said summation element are capable of correcting for rapid short term fluctuations in the tool mode signal.

13. A method for eliminating the tool mode signal from a signal received at a receiver, said method comprising the steps of:

calibrating said receiver to obtain a predicted value for said tool mode signal;

subtracting said predicted value from the received signal;

determining whether subsequent received signals include both tool mode and formation mode signals or only a tool mode signal;

averaging the received signal with the predicted value if the received signal comprises only a tool mode signal so as to update said predicted tool mode signal and adapt to gradual changes in the tool mode signal.

14. The system according to claim 10 wherein said average is a moving average.

15. The system according to claim 11 wherein moving average includes 40 data points.

* * * * *